May 26, 1959 J. S. GARWOOD 2,887,782
GYRO MAGNETIC COMPASS SYSTEM
Filed Jan. 29, 1954
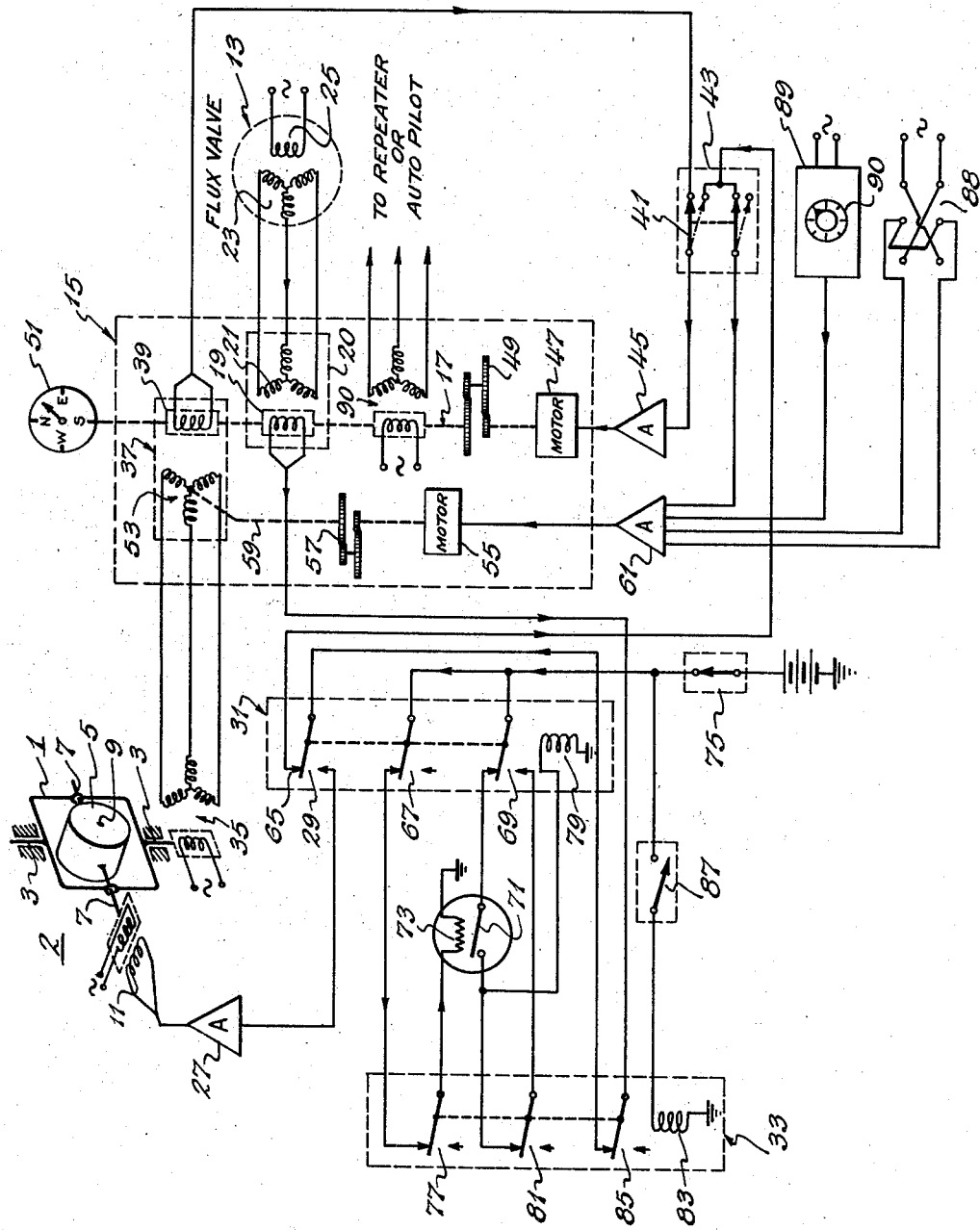
INVENTOR
JOHN S. GARWOOD
BY
Herbert H. Thompson
his ATTORNEY.

United States Patent Office 2,887,782
Patented May 26, 1959

2,887,782

GYRO MAGNETIC COMPASS SYSTEM

John S. Garwood, Searingtown, N.Y., assignor to Sperry Rand Corporation, a corporation of Delaware Application January 29, 1954, Serial No. 407,138

9 Claims. (Cl. 33—222)

This invention relates to gyro magnetic compass systems of the wind in which a direction gyro is made to integrate or average the movements of a magnetic compass instrument (or the position of the magnetic meridian indicated thereby) and thereby to provide a non-oscillatory reference heading based on the direction of the earth's magnetic field for aiding the steering of the craft in which the system is employed. Such systems are used both as visual aids to human pilots and as azimuth references for automatic pilots and other devices. The most common form uses the flux valve type of magnetic compass as the controller for the gyroscope, as shown in Patent No. 2,357,319, issued on September 5, 1944, to Esval and Frische for Flux Valve Magnetic Compass. The gyroscope may be in the form of a simple directional gyroscope or may be the directional gyroscope portion of a more complex gyroscopic array such as three gyro stable platforms, similar to that described in Patent No. 2,591,697 to R. F. Hays, Jr., dated April 8, 1952.

It is usual and important in such systems to arrange the control of the directional gyroscope so that it will follow the wanderings of the magnetic compass very slowly (on the order of 3° a minute), but this slow-following characteristic has the disadvantage that each time the system is started up, the heading angle indicated by the system may differ at first from the desired direction as indicated by the magnetic compass by a large angle; and, consequently, a considerable delay may occur before the slowly moving gyroscope has caused the system to indicate the direction demanded by the magnetic compass.

It is an important feature of this invention to provide an automatic means for bringing the direction indicated by the system very quickly into line with the direction demanded by the magnetic compass when the system is first switched on by rapidly rotating elements of the system other than the slowly precessing gyroscope. Thus, I avoid increasing the precessing torque on the gyro, as has been heretofore proposed for the purpose.

Another feature of this invention is the provision of a delayed action starting circuit which automatically disconnects the quick-orienting means and restores normal connections after the system has been lined up with the magnetic compass.

Another feature of the invention is to provide a method of and means for causing the system to rapidly indicate a direction other than the local magnetic direction at which the gyroscope is used as a free directional gyroscope, uncoupled from the magnetic compass. Such a use is important in the polar regions where the free gyro is set with reference to a grid with lines parallel to the Greenwich meridian.

Another feature of the invention is to provide a method of, and means for, automatically rapidly aligning the direction indicated by the magnetic compass after the gyroscope has been so used as a free directional gyroscope in the regions of the magnetic poles where the direction demanded by the magnetic compass is unreliable.

Another feature of this invention is to provide a method of and means for causing the system to indicate the unintegrated or unaveraged magnetic direction indicated or demanded by the remote magnetic compass in case the gyroscope becomes inoperative.

My invention also may have readily incorporated therein a means for correcting the system for the effects of the rotation of the earth and the convergence of the earth's meridians.

Other objects and advantages of the invention will be understod from the following description and the accompanying drawings in which a concrete embodiment is shown for purposes of illustration of the principles of my invention.

The single sheet of drawings shows a wiring diagram supplemented by a diagrammatic showing of some of the physical elements of my improved quick synchronizing gyro magnetic compass system. The directional or slave gyro 2 is illustrated as a conventional form of directional gyro having a vertical ring 1 mounted for freedom about a normally vertical axis 3—3 on the craft, a rotor case 5 journalled on horizontal trunnions 7—7 in the vertical ring within which case the rotor (not shown) is mounted for spinning about a normally horizontal spin axis 9. The spin axis is normally maintained level by an erection device (not shown). The gyroscope is normally slaved to the magnetic meridian by means of an electrical torquer 11 which exerts a weak torque about the horizontal axis of the gyroscope and causes it to precess in azimuth toward the meridian whenever the position of the directional gyroscope wanders from the position required by the magnetic compass.

The magnetic compass is shown in the form of a flux valve 13, for instance as described in the aforementioned patent of Frische and Esval. I prefer to interpose between the flux valve and the directional gyroscope a relay or a master indicating instrument 15 having a primary shaft 17 which is normally maintained fixed with respect to the magnetic meridian from the outputs of the flux valve and slave gyro. For this purpose, I position compass card 51 by an electrical remote control synchro system from the gyroscope, preferably by a synchro transmitter-generator system, the output actuating a servomotor which positions the card, but which is compared to the position of the magnetic meridian indicated by the flux valve by a similar synchro system which produces an error signal for actuating a torquer on the gyroscope. As specifically shown, I mount on shaft 17 the rotor 19 of a synchro transformer 20, the polycircuit stator 21 of which is connected to the output polycircuit winding 23 of the flux valve, the output of which varies with its position in the earth's magnetic field, as well understood in the art. The primary winding 25 is supplied with single phase, alternating current. Whenever the position of the winding 19 departs from a null position with respect to the field generated by the winding 21, an A.C. voltage is induced in winding 19 which is supplied to phase sensitive amplifier 27, which supplies current to the torquer 11 of the gyro 2. A switch 29 of the multi-contact relay 31 is interposed between winding 19 and amplifier 27, and it is only when switch 29 is in the "down" position and the switch 85 of relay 33 is in the uppermost position (which is the normal operating position of the relays) that torquer 11 is energized.

The position of the shaft 17 is primarily controlled from the slave gyro 2 by a pair of synchro signal generators 35 and 37, generator 35 being mounted on the vertical axis 3 of the vertical ring, the polycircuit output of which is connected to the other generator 37, one part 39 of which rotates with shaft 17 of the master indicator 15. Whenever the position of the output winding 39 of the synchro generator 37 varies from its null position with respect to the field created by winding 53, a reversible phase variable voltage is generated which is shown as passing through one contact 41 of the switch 43 and thence into phase sensitive amplifier 45, the output of which is connected to the servomotor 47 connected preferably through reduction gearing 49 to the shaft 17. Therefore, shaft 17 is turned whenever the winding 39 departs from its null position to restore it to the null.

In order to accomplish the purpose of this invention in quickly synchronizing the indications of the gyro magnetic system with the magnetic compass when first starting up, I avoid waiting for the gyro to be slowly precessed into the magnetic meridian and provide a means for synchronizing the card 51 on the master indicator without respect to the gyro position. To this end, I provide a means for altering the relation between the synchro units of the pair of synchro generators 35 and 37. I achieve this preferably by also rotatably mounting the other or field winding 53 of generator 37 thereof in addition to the output winding 39, and I provide means for readjusting the position of the field winding 53 from the output of the synchro generator 20 which, of course, is controlled secondarily by the flux valve. To this end, I provide an auxiliary servomotor 55 which rotates through reduction gearing 57, having a reduction ratio, for example, of 1:1,000 for a 10,000 r.p.m. motor, the shaft 59 on which the rotatable winding 53 is mounted, and I control this servomotor from a second phase sensitive amplifier 61 which in turn is connected through switch 43 to the upper contact 65 of relay 31, in which position the relay is normally biased when this system is shut down, that is, when the starting switch (not shown) is open. Therefore, when starting up, the output of winding 19 is transferred from amplifier 27 and torquer 11 to amplifier 61 and servomotor 55. Thus, a closed loop is provided within the master indicator 15 by which the card 51 indicates the magnetic meridian as determined by the flux valve 13.

The position of the gyroscope at this time remains fixed so that if the ship turns, the gyro still stabilizes the card by the fact that the synchro transmitter 35 is stabilized by the gyro, which is operating as a free gyro under these conditions, and the servomotor 47 is still controlled by the output of synchro generator 37. Preferably, I also provide a means whereby the quick synchronization period may be stopped after the card 51 has been synchronized, which is a comparatively short period. To this end, I have provided on relay 31 two additional pairs of contacts 67 and 69 which are likewise in the position shown in the drawings when the system is shut down and when it is first started up. Thermally operated switch 71 is placed in circuit with the upper contacts of switches 69 and 81, switch 71 being normally open but is closed a predetermined interval after the circuit is completed through the heater winding 73 thereof.

When power is first applied to the system, relay 31 temporarily remains in the position shown with its exciting coil 79 unenergized so that the voltage from the synchro rotor 19 is applied to amplifier 61 through contacts 65 and 85 and switch 43. However, at the same time, a direct current is supplied to the heater coil 73 of the thermal relay 71 and causes its contact to close after a period of time long enough to permit the card 51 to align itself with the meridian, which is much shorter than that would be required if the gyro alone were allowed to perform this function through its slow precession that normally takes place. When the thermal relay contacts 71 close as the coil 73 heats up, the coil 79 of relay 31 is energized and held in the energized condition by holding contact 69 of relay 31 and contact 81 of relay 33. Thus, switches 29, 67 and 69 remain in the lower positions during normal operation of the system, and the slaved gyro controls the position of card 51 and of the transmitter 90 for controlling repeater compasses and/or autopilots, as indicated by legends on the drawing. However, the heater coil 73 of relay 33 is denergized by the opening of contacts 67 thus allowing it to cool so as to be ready for performing the above described operation when again needed.

As indicated above, my invention is also adapted for use as a free gyro, for instance in high latitudes when the magnetic compass becomes unreliable, and my quick setting system comes into play when it is desired to later restore magnetic slaving. To operate my device in this manner, switch 87 is closed to establish a circuit through actuating coil 83 of the relay 33. This opens the contact 85, breaking the lead from the synchro generator coil 19, and thus removing the possibility of its signal being applied either to amplifier 27 or 61. The opening of contacts 81 causes relay 31 to return to its deenergized position and the opening of contacts 77 prevents the application of direct current to the heater coil 73. Thus, the system is ready to rapidly align as in the starting mode above described as soon as switch 87 is opened, shortly after which the output of synchro rotor 19 is restored to the system and, as previously described, the fast aligning cycle takes place.

Also, when operating in the polar regions, it may be that it is desirable at the time the magnetic slaving is discontinued to bring the system on to a new magnetic setting, which is known as the "grid" direction, a direction with reference to the "Greenwich" meridian. At this time switch 87 is opened as in the previously described mode of operation and the normally open double throw switch 88 is thrown one way or the other to apply an A.C. signal of one or the opposite phase to amplifier 61 to drive the servo 55 in the desired direction to bring the card 51 into any desired position.

In case of breakdown of the directional gyroscope, it may be desirable to operate the system as a direct reading magnetic compass without smoothing out the short period fluctuations, i.e., integrating the readings thereof. If this is desired, switch 75, which is normally closed, is opened, thus removing the power which energizes the coils 79 and 83 of relays 31 and 33, so that their switches remain as shown in the drawings. In addition, switch 43 is also manually rotated clockwise to its lower position, thus removing the connection between the synchro rotor 39 and amplifier 45, and between synchro 20 and amplifier 27, and at the same time connecting the synchro 20 to amplifier 45. In this mode of operation, shaft 17 will indicate the magnetic direction demanded by the magnetic compass without the integrating action of the gyro.

In my system also, gyro corrections may readily be applied to the system to compensate for the rotation of the earth and the convergence of the earth's meridians toward the poles, both of which corrections become important in high latitudes. An example of the first mentioned correction is shown applied to a gyro magnetic system in U.S. Patent No. 2,699,612 of Spencer Kellogg II, issued January 18, 1955, for Azimuth Data Providing Systems for Dirigible Craft. Both of these corrections are shown in U.S. Patent No. 2,729,108 of Vacquier, Cope and Proskauer, issued January 3, 1956, for Control Systems for Gyroscopic Instruments. To represent either or both of these corrections, I have shown in the drawings a box 89 provided with a latitude setting knob 90 and into which is also introduced (by means not shown) the E-W speed component of the craft, whereby a composite signal is generated for both corrections which is fed into the amplifier 61 to supply an additional control factor to the auxiliary servomotor 55 and hence to the synchro generator 37 at all times. The importance of latitude corrections for free gyros, that is, when the gyro is operating as a free gyro, has long been appreciated, but as pointed out in the aforesaid Kellogg patent, it is also advantageous to retain such corrections during the time that the gyro is slaved to the magnetic compass, since by this means a stand-off error otherwise present due to the continuous drift of the gyro in one direction due to the earth's rotation is eliminated. The amplifier 61, therefore, remains operative and under the control of the output of the latitude corrector 89 at all times to adjust the position of the field 53 of synchro 37 through motor 55. On the other hand, for quick setting, an additional signal is fed into the amplifier 61 from the synchro generator 20, which signal normally goes to the torquer-amplifier 27 during gyro magnetic operation. If the system is being operated in the free gyro mode, the latitude corrector remains operative to control motor 55, but no signal from synchro 20 is effective because of the closing of switch 87, as explained.

Since many changes could be made in the above construction and many apparently widely different embodiments of this invention could be made without departing from the scope thereof, it is intended that all matter contained in the above description or shown in the accompanying drawings shall be interpreted as illustrative and not in a limited sense. Thus, I have described my invention as applicable to visual azimuth reference devices, but it is obviously also applicable to a gyro magnetic compass system used as a base line for an automatic pilot or other navigational device in addition to or instead of being used as a visual directional indicator. If used in an automatic pilot, the synchro repeater 90 on shaft 17 may be used to operate the directional reference of the automatic pilot instead of or in additional to operating a repeater compass as indicated.

What is claimed is:

1. A gyro magnetic compass system including a magnetic compass and a slaved directional gyroscope normally slaved thereto so as to slowly follow the demands of the magnetic compass, a compass element, first servo means continuously positioning said element from said gyroscope, and means for quickly resetting said element when starting up the system to agree with the demands of the magnetic compass and without awaiting the normal slaving cycle of the gyroscope, comprising auxiliary, normally ineffective, second servo means for operating temporarily upon said first servo means to alter the angular relationship between the element and the gyroscope to bring the element into proper relationship to the ship's heading as indicated by the magnetic compass, and means for automatically bringing said auxiliary servo means into action upon starting up the system whereby the compass element is continually supervised by the gyroscope during the quick reset period.

2. A quick setting device for gyro magnetic compass systems in which the position of the gyro is slowly corrected when wandering from the position demanded by the magnetic compass, comprising a master azimuth reference device, a pair of synchros, one coupled to said gyro and the other included in said master device for producing a first signal to primarily position said device from said gyro, said azimuth device including means for producing a second signal upon disagreement of said device with said magnetic compass, a torquing device on the gyro normally controlled from said second signal, a servomotor governed by said first signal for actuating said azimuth device, an auxiliary servomotor for altering the angular relation between said synchros for quick resetting purposes, and means for temporarily transferring said second signal from said torquer to said auxiliary servomotor.

3. A quick setting means for gyro magnetic compass systems as claimed in claim 2, having delayed action means for stopping said quick setting cycle and automatically restoring the system to normal slaving operation.

4. A gyro magnetic compass system comprising a magnetic compass, a gyroscope of the directional type normally slowly slaved thereto, a master compass indicator normally controlled primarily from said gyroscope as supervised by said magnetic compass, manual means for severing the control between said magnetic compass and gyroscope whereby the gyroscope operates as a free gyroscope and said indicator is controlled solely by said gyroscope, means automatically brought into action upon further operation of said manual means for first quickly resetting the master indicator from said magnetic compass before slaving said gyroscope, and second means automatically brought into action at a predetermined interval thereafter for restoring the slaving of said gyroscope and severing said resetting of the master indicator from said magnetic compass.

5. A gyro magnetic compass system including a magnetic compass and a directional gyroscope normally slaved thereto so as to slowly follow the demands of the magnetic compass, a compass element, first servo means continuously positioning said element from said gyroscope, and means for quickly resetting said element when starting up the system to agree with the demands of the magnetic compass without awaiting the normal slaved orientation of the gyroscope, comprising auxiliary, normally ineffective, second servo means for operating temporarily upon said first servo means to alter the angular relationship between the element and gyroscope to bring the element into proper relationship to the ship's heading as indicated by the magnetic compass, means for automatically bringing said auxiliary servo means into action upon starting up the system, and delayed action means for stopping said quick setting cycle and automatically restoring the system to normal slaving operation.

6. A gyro magnetic compass system including a magnetic compass and a directional gyroscope normally slaved thereto so as to slowly follow the demands of the magnetic compass, a compass element, first servo means continuously positioning said element from said gyroscope, and means for quickly resetting said element when starting up the system to agree with the demands of the magnetic compass without awaiting the normal slaving resetting of the gyroscope, comprising auxiliary, normally ineffective, second servo means for operating temporarily upon said first servo means to alter the angular relationship between the element and gyroscope to bring the element into proper relationship to the ship's heading as indicated by the magnetic compass, means generating a signal upon mismatch between said element and the compass, said signal normally controlling said slaving, and means for transferring said signal to control said second servo means upon starting up of said system, during which period the gyroscope operates as a free gyroscope.

7. In a gyro magnetic compass system having a magnetic compass and a directional gyroscope slaved thereto by a torquer, a master azimuth reference device controlled from said compass and gyroscope including a servomotor for driving same and a compass card driven therefrom, a pair of synchros, one coupled to said gyroscope and one to said device for producing a signal upon disagreement between said gyroscope and card which normally controls said servomotor, comparison means interconnecting said magnetic compass and master device producing a signal which normally controls said torquer, an auxiliary motor for shifting the angular relationship between the electrical vectors within the stators of said pair of synchros, and means for temporarily transferring the signal generated by said comparison means from said torquer to said auxiliary motor for quick synchronization of the master azimuth reference device with respect to the magnetic compass.

8. A gyro magnetic compass system as claimed in claim 7, having additional means for continuously introducing a correction for latitude error through said auxiliary motor.

9. A gyro magnetic compass system comprising a magnetic compass, a gyroscope of the directional type normally slowly slaved thereto, a master compass indicator normally controlled primarily from said gyroscope as supervised by said magnetic compass, manual means for severing the control between said magnetic compass and gyroscope whereby the gyroscope operates as a free gyroscope and said indicator is controlled solely by said gyroscope for any desired period, means brought into action automatically upon returning said severing means to a predetermined condition for first quickly resetting the master indicator from said magnetic compass before slaving said gyroscope, and a delayed action means brought into action automatically at a predetermined interval thereafter for restoring the slaving of said gyroscope and discontinuing said resetting cycle, regardless of the position of the gyroscope during its free gyroscope mode of operation.

References Cited in the file of this patent

UNITED STATES PATENTS

| | | |
|---|---|---|
| 2,126,935 | Von Manteuffel | Aug. 16, 1938 |
| 2,140,191 | Schuchardt et al. | Dec. 13, 1938 |
| 2,161,241 | Bates | June 6, 1939 |
| 2,524,756 | Braddon et al. | Oct. 10, 1950 |

FOREIGN PATENTS

| | | |
|---|---|---|
| 818,850 | France | June 28, 1937 |